Figure 1:
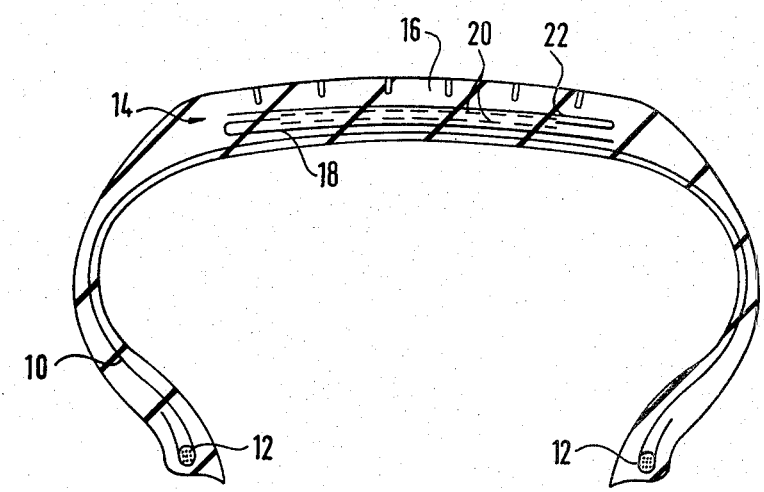

United States Patent [19]

Wilcox

[11] 4,240,488
[45] Dec. 23, 1980

[54] TIRE BREAKER STRIP WITH FOLDED PLIES

[75] Inventor: Brian L. Wilcox, Birmingham, England

[73] Assignee: Dunlop Limited, London, England

[21] Appl. No.: 7,687

[22] Filed: Jan. 30, 1979

[30] Foreign Application Priority Data

Feb. 9, 1978 [GB] United Kingdom ............... 5186/78
Jul. 27, 1978 [GB] United Kingdom ............. 31416/78

[51] Int. Cl.³ .................................................. B60C 9/18
[52] U.S. Cl. ....................... 152/361 FP; 152/361 DM
[58] Field of Search ..... 152/361 R, 361 DM, 361 FP; 156/126

[56] References Cited

U.S. PATENT DOCUMENTS

| 3,623,529 | 11/1971 | Fausti | 152/361 FP |
| 3,831,656 | 8/1974 | Senger et al. | 152/361 FP |
| 3,949,797 | 4/1976 | Mirtain et al. | 152/361 FP |
| 3,973,612 | 8/1976 | Mezzanotte | 152/361 FP |

FOREIGN PATENT DOCUMENTS 2547813 4/1977 Fed. Rep. of Germany .... 152/361 FP

Primary Examiner—Michael W. Ball
Attorney, Agent, or Firm—Stevens, Davis, Miller & Mosher

[57] ABSTRACT

A radial tire with improved uniformity of transverse stiffness of its breaker. In the preferred embodiment, two superimposed folded-edge steel cord plies are placed over and under one or more layers of cords formed of a material having a zero or negative temperature coefficient of expansion. This material is preferably nylon.

9 Claims, 2 Drawing Figures

TIRE BREAKER STRIP WITH FOLDED PLIES

IMPROVEMENTS IN OR RELATING TO VEHICLE TIRES

This invention relates to vehicle tires, and more particularly to tires of the radial or substantially radial carcass type, i.e., tires wherein the cords of the carcass ply or plies lie at an angle in the range 70° to 90° with respect to the mid-circumferential plane of the tire.

It is known that radial carcass tires in general have a breaker, that is a substantially inextensible circumferential band of suitable material disposed over the ply or plies and under the tread, for the purpose of tread stabilization and leading, inter alia, to improved tread wear characteristics and vehicle handling ability in comparison to a tire not having a breaker. For vehicles intended to travel at high speeds, the preferred breaker material is steel wires. Usually, the breaker component of such a tire is supplied to the tire builder as an elongated strip of many steel wires which are substantially mutually parallel and embedded in a thin layer of natural or synthetic rubber. Tires of improved mechanical properties are formed if the edges of the breaker strip are folded over, giving double breaker thickness strips along the edges of the breaker layer. The folds are usually such that the central band of each ply of the breaker is of single thickness rather than doubled, to avoid undesirable inflexibility with consequent loss of riding comfort. However, this leads in turn to uneven wear across the width of the tread, particularly on engine-driven wheels. The present invention proposes a tire having a breaker of a form which obviates or mitigates the above-mentioned problems.

According to the invention, there is provided a vehicle tire of the radial or substantially radial carcass type and having a breaker comprising a first steel cord ply having one edge thereof folded radially outwardly and axially inwardly of the tire to form a double-thickness layer extending transversely of the breaker by an amount less than half the overall width of the breaker, a second steel cord ply disposed radially outwardly of said first steel cord ply and the folded edge thereof, said second steel cord ply having one edge thereof on the transversely opposite side of the breaker from the folded edge of said first steel cord ply, folded radially inwardly and axially inwardly of the tire to form a double-thickness layer extending transversely of the breaker by an amount less than half the overall width of the breaker, the axially inward edges of the folded edges being spaced apart transversely of the breaker, and one or more further cord layers located radially between the first and second steel cord plies and axially between said spaced-apart axially inward edges of the folded edges, the cords in the or each said further cord layer being of a material which has a zero or negative temperature coefficient of expansion.

Preferably said further cord layer or layers are laid with the cords aligned in a range of angles between the maximum angles with respect to the mid-circumferential plane of the tire at which said cords maintain at least a predetermined minimum tensile strength in use; alternatively or additionally said cords being formed of a material having a predetermined elongation at a given load which may be any chosen value up to and including breaking load and/or having at least a predetermined modulus of elasticity.

Said range of angles preferably is limited to not more than ten or preferably five degrees on either side of said plane.

The number of further cord layers, from one upwards, may be chosen in conjunction with the elastic modulus of the cords thereof and of the steel cords, as to reduce transverse variations in the elastic modulus of the breaker as a whole to below a predetermined proportional or absolute limit, and preferably to give the complete breaker a substantially uniform transverse elastic modulus. Where there are two or more of said further layers, the cords in adjacent layers are preferably oppositely, and preferably also equally, inclined with respect to the mid-circumferential plane of the tire. Thus the desirable properties of folded-edge steel cord breakers may be obtained with a reduced or substantially without the concomitant unevenness in transverse tread wear properties while preserving in large measure the desired ride characteristics. The zero or negative temperature coefficient of expansion of the cords of the further cord ply tends to preserve the dimensional stability of the tire even when the tire reaches elevated temperatures, such as might be encountered at high vehicle speeds.

The steel cords may have any suitable combination of steel, cord and strand dimensions, and twist/stranding configurations chosen from the various possibilities known in the art.

The material of the cords of the further cord ply may be nylon, or any suitable equivalent thereof, and the cross-sectional shape and dimensions of the cords, and the density thereof in the further ply, may be chosen in accordance with principles known in the art of vehicle tires.

The remaining material of the tire may be any suitable natural or synthetic rubber, compounded as desired with appropriate additive(s) known in the art.

Figure 2:
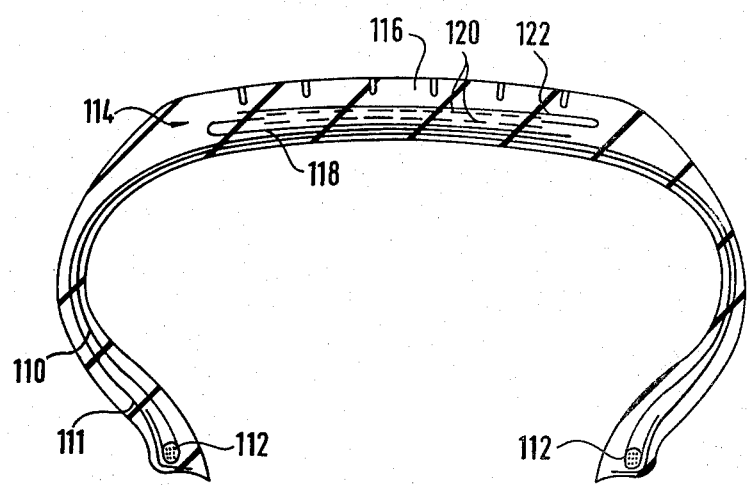

Embodiments of the invention will now be described by way of examples with reference to the accompanying drawings wherein:

FIG. 1 is a transverse cross-section of a first embodiment of the invention in the form of a single radial ply tire; and FIG. 2 is a transverse cross-section of a second embodiment of the invention in the form of a dual radial ply tire.

Referring first to FIG. 1, illustrated therein is a transverse cross-section of a vehicle tire in accordance with the invention, in the form of a monoply radial carcass tire with the novel breaker about to be described. In detail, the tire of FIG. 1 comprises a single layer textile ply 10 of substantially weftless fabric and arranged so that the warps lie substantially in the plane of FIG. 1, i.e. the bias angle is substantially 90° with respect to the mid-circumferential plane of the tire. The edges of the ply 10 are folded round a pair of tire bead wires 12, according to general practice in the art of tires.

Over the radially outer peripheral region of the ply 10 is placed a breaker 14 which extends circumferentially around the tire and is substantially inextensible in order to improve the stability of a tire tread 16 formed, in known manner, of synthetic rubber over the breaker 14. The breaker 14 has a structure, in accordance with the first embodiment of the invention and to obviate or mitigate the previously discussed problems, which provides a nearly uniform elastic modulus over the width of the tread 16. This breaker structure takes the form of a first ply 18 of steel cords laid at approximately 22° with respect to the mid-circumferential plane of the tire, and having its left edge (as viewed in FIG. 1) folded, prior to winding on the tire carcass, outwardly and rightwards back over the unfolded major portion of the ply 18 to form a double thickness edge laterally extending for about one-fifth of the width of the breaker 14.

The breaker structure also includes a two-layer circumferential ply winding 20 of substantially weftless nylon cord ply disposed so that the cords run substantially parallel to the mid-circumferential plane of the tire, i.e. the bias angle of the ply winding 20 is substantially 0°. The width of the ply winding 20 is approximately three-fifths of the overall width of the breaker 14 and is substantially centrally symmetrically disposed, such that the left edge of the ply winding 20 is alongside the edge of the fold of the ply 18. The breaker structure further includes a second ply 22 of steel cords wound over the ply 18 and the ply winding 20 with the cords laid at approximately 22° with respect to the mid-circumferential plane of the tire but oppositely inclined to said plane in relation to the inclination of the cords of the ply 18. The ply 22 has its right edge (as viewed in FIG. 1) folded, prior to winding onto the tire carcass, inwardly and leftwards back over the unfolded major portion of the ply 22 to form a double thickness edge laterally extending for about one-fifth of the width of the breaker 14. This brings the folded edge of the ply 22 alongside the right edge of the ply winding 20.

The above described breaker may be summarized as follows (going from the radially innermost layer outwards, i.e. in the order in which the breaker components are wound on the tire carcass): (a) a first layer of steel cord ply (18) with a 22° bias angle and a one-fifth width folded-over edge; (b) a three-fifths width double layer of nylon cord ply winding (20) with a 0° bias angle; and (c) a second layer of steel cord ply (22) with a 22° bias angle (but laid oppositely inclined to the cords of the ply (18) and a one-fifth width folded-under edge.

This structure provides a breaker 14 suitable for high-speed radial carcass tires with the strength of steel and the advantages of folded-edge plies, while the nylon ply winding 20 gives substantial uniformity of elastic modulus to the breaker 14 across its width giving more uniform wear, in use, of the tread 16 across its width without the sacrifice of vehicle riding properties entailed in a constant thickness steel-only breaker.

Referring now to FIG. 2, illustrated therein is a transverse cross-section of a second embodiment of vehicle tire in accordance with the invention, in the form of a two-ply radial carcass tire with the novel breaker about to be described. In detail, the tire shown in FIG. 2 comprises two superimposed layers of textile plies 110 and 111, each of tire cord fabric, and arranged so that the cords lie substantially in the plane of the drawing, i.e. the bias angle of each of the plies 110 and 111 is substantially 90° with respect to the mid-circumferential plane of the tire. The edges of the plies 110 and 111 are folded round a pair of tire bead wires 112, according to general practice in the art of tires.

Over the radially outer peripheral region of the ply 111 is placed a breaker 114 which extends circumferentially around the tire and is substantially inextensible in order to improve the stability of a tire tread 116 formed, in known manner, of a synthetic rubber composition over the breaker 114. The breaker 114 has a structure, in accordance with the second embodiment of the invention and to obviate or mitigate the previously discussed problems, which provides a nearly uniform elastic modulus over the width of the tread 116. This breaker structure takes the form of a first ply 118 of steel cords laid at a bias angle between 16° and 25° and preferably at approximately 22° with respect to the mid-circumferential plane of the tire, and having its left edge (as viewed in FIG. 2) folded, prior to assembling on to the tire carcass, outwardly and rightwards back over the unfolded major portion of the ply 118 to form a double thickness edge laterally extending for about one quarter of the width of the breaker 114.

The breaker structure also includes a two-layer circumferential ply winding 120 of substantially weftless nylon cord ply disposed so that the cords run substantially parallel to the mid-circumferential plane of the tire, i.e. the bias angle of the ply winding 120 is within 5° of the mid-circumferential plane of the tire.

The bias angle in one layer of the winding 120 is preferably substantially equal in magnitude to the bias angle of the other layer but oppositely inclined with respect to the mid-circumferential plane of the tire in the event that these bias angles depart from the preferred value of 0°.

The width of the ply winding 120 is approximately one-half of the overall width of the breaker 114 and is substantially centrally symmetrically disposed, such that the left edge of the ply winding 120 is alongside the edge of the fold of the ply 118. The breaker structure further includes a second ply 122 of steel cords assembled over the ply 118 and the ply winding 120 with the cords laid at a bias angle between 16° and 25° and preferably at approximately 22° with respect to the mid-circumferential plane of the tire but oppositely inclined to the said plane in relation to the inclination of the cords of the ply 118, (i.e. the cords of the layers 118 and 122 preferably have equal but opposite bias angles). The ply 122 has its right edge (as viewed in FIG. 2) folded, prior to assembly onto the tire carcass, inwardly any leftwards back over the unfolded major portion of the ply 122 to form a double thickness edge laterally extending for about one quarter of the width of the breaker 114. This brings the folded edge of the ply 122 alongside the right edge of the ply winding 120.

The above described breaker may be summarized as follows (going from the radially innermost layer outwards, i.e. in the order in which the breaker components are assembled on the tire carcass); (a) a first layer of steel cord ply (118) with a 22° bias angle and a one quarter width folded-over edge; (b) a one half width double layer of nylon cord ply winding (120) with a low (5° or under) and preferably 0° bias angle in each layer and (c) a second layer of steel cord ply (122) with a 22° bias angle (but laid oppositely inclined to the cords of the ply (118) and a one quarter width folded-under edge.

This structure provided a breaker 114 suitable for high-speed radial carcass tires with the strength of steel and the advantages of folded-edge plies, while the nylon ply winding 120 gives substantially uniformity of elastic modulus to the breaker 114 across its width giving more uniform wear, in use, of the tread 116 across its width without the sacrifice of vehicle riding properties entailed in a constant thickness steel-only breaker.

Referring now to possible modifications of either of the above embodiments, different widths of the folded edges of the steel plies 18 and 20, or 118 and 122, and of the nylon ply winding 20, or 120, may be employed within the scope of the invention. The edges of the nylon ply winding 20 or 120 need not laterally extend to the edges of the folds of the steel cord plies 18 and 22, or 118 and 122. Five other unillustrated embodiments of the invention may be as described above with reference to the drawings, except that the layers of the winding 20 or 120 would have opposite and substantially equal bias angles of 1°, 2°, 3° and 5°, respectively. Even greater bias angles could be imposed on the nylon layers, up to the maximum angles (discoverable by non-inventive experiments) at which these layers maintained at least a predetermined minimum tensile strength and/or elongation at a given load and/or modulus of elasticity in use and as appropriate to the desired performance of the tire. Bias angles which are unequal and/or similarly (as opposed to oppositely) inclined could be chosen within the scope of the invention. Materials other than nylon may be employed in addition to or as an alternative to nylon for the cords of the ply windings 20 and 120. A single-ply tire has been illustrated in FIG. 1 by way of example and a two-ply tire in FIG. 2 by way of a further example, but the above-described breaker or any variation thereof may be applied to carcasses with greater numbers of plies, and any known form of vehicle tire wherein a breaker is necessary or desirable may have a breaker in accordance with the present invention. The invention may be applied to conventional tires and to tires designed to be used when deflated, e.g. the "Denovo" (Registered Trade Mark) tire as manufactured by Dunlop Limited.

Other modifications and variations may be made within the scope of the invention.

Having now described my invention what I claim is:

1. A vehicle tire of the radial carcass type and having a breaker structure comprising a first radially inwardly steel cord ply having a bias angle between 16° and 25° and having one edge thereof folded radially outwardly and axially inwardly of the tire to form a double thickness layer extending transversely of the breaker by an amount less than half the overall width of the breaker, a second steel cord ply disposed radially outwardly of said first steel cord ply and the folded edge thereof, said second steel cord ply having one edge thereof on the transversely opposite side of the breaker from the folded edge of said first steel cord ply, folded radially inwardly and axially inwardly of the tire to form a double-thickness layer extending transversely of the breaker by an amount less than half the overall width of the breaker, the axially inward edges of the folded edges being spaced apart transversely of the breaker, and at least one further cord layer located radially between the first and second steel cord plies and axially between said spaced-apart axially inward edges of the folded edges but without overlapping said folded edges, the cords of said at least one further cord layer having a bias angle of not more than 10° and being of a material which has a zero or negative temperature coefficient of expansion to provide a substantially uniform elastic modulus across the width of the breaker.

2. A vehicle tire of the radial carcass type and having a breaker structure comprising a first radially inwardly steel cord ply having a bias angle of about 22° and having one edge thereof folded radially outwardly and axially inwardly of the tire to form a double thickness layer extending transversely of the breaker by about one-fifth the overall width of the breaker, a second steel cord ply disposed radially outwardly of said first steel cord ply and the folded edge thereof, said second steel cord ply having one edge thereof on the transversely opposite side of the breaker from the folded edge of said first steel cord ply, folded radially inwardly and axially inwardly of the tire to form a double-thickness layer extending transversely of the breaker by about one-fifth the overall width of the breaker, the axially inward edges of the folded edges being spaced apart transversely of the breaker, and at least one further cord layer having an axial width of about three-fifths the overall width of the breaker and located radially between the first and second steel cord plies and axially between said spaced-apart axially inward folded edges, having a bias angle of not more than 10° and the cords of said at least one further cord layer being of a material which has a zero or negative temperature coefficient of expansion.

3. A tire according to claim 2 wherein said range of angles is limited to not more than five degrees on either side of said plane.

4. A tire according to claim 1, wherein said number of further cord layers is from one upwards and said number together with the elastic modulus of the cords thereof and of the steel cords forms a breaker structure with reduced transverse variations in the elastic modulus of the breaker as a whole to a value below a predetermined limit.

5. A tire according to claim 4 wherein said number and modulus are chosen to give the complete breaker structure a substantially uniform transverse elastic modulus.

6. A tire according to claim 1, wherein there are at least two of said further layers and the cords in adjacent layers are oppositely inclined with respect to the mid-circumferential plane of the tire.

7. A tire according to claim 6 wherein the cords in adjacent ones of said at least two further layers are equally and mutually oppositely inclined with respect to said mid-circumferential plane.

8. A tire according to claim 1 wherein the cords of each said further layer are composed of nylon.

9. A vehicle tire of the radial carcass type and having a breaker structure comprising a first radially inwardly steel cord ply having a bias angle between 16° and 25° and having one edge thereof folded radially outwardly and axially inwardly of the tire to form a double thickness layer extending transversely of the breaker by about one-fourth the overall width of the breaker, a second steel cord ply disposed radially outwardly of said first steel cord ply and the folded edge thereof, said second steel cord ply having a bias angle between 16° and 25° and having one edge thereof on the transversely opposite side of the breaker from the folded edge of said first steel cord ply, folded radially inwardly and axially inwardly of the tire to form a double-thickness layer extending transversely of the breaker by about one-fourth the overall width of the breaker, the axially inward edges of the folded edges being spaced apart transversely of the breaker, and at least one further cord layer having an axial width of about one-half the overall width of the breaker and located radially between the first and second steel cord plies and axially between said spaced-apart axially inward edges of the folded edges, the cords of said at least one further cord layer having a bias angle of not more than 10° and being of a material which has a zero or negative temperature coefficient of expansion.

* * * * *